(12) United States Patent
Jang

(10) Patent No.: US 8,085,509 B2
(45) Date of Patent: Dec. 27, 2011

(54) WRITE HEAD WITH COMMON MODE TERMINATION RESISTOR

(75) Inventor: Eunkyu Jang, San Jose, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 937 days.

(21) Appl. No.: 12/080,640

(22) Filed: Apr. 3, 2008

(65) Prior Publication Data

US 2009/0251823 A1    Oct. 8, 2009

(51) Int. Cl.
*G11B 5/147* (2006.01)
*G11B 5/17* (2006.01)

(52) U.S. Cl. ............ 360/294.7; 360/234.5; 360/125.31; 360/123.39

(58) Field of Classification Search .......... 360/234.5, 360/294.7, 125.31, 125.74, 317, 123.01, 360/123.15, 123.38, 123.39
See application file for complete search history.

(56) References Cited

U.S. PATENT DOCUMENTS

| | | | |
|---|---|---|---|
| 6,671,118 B2 | 12/2003 | Putnam et al. | |
| 7,119,990 B2 | 10/2006 | Bajorek et al. | |
| 7,589,936 B1 * | 9/2009 | McFadyen et al. | 360/123.1 |
| 2001/0036028 A1 * | 11/2001 | Putnam et al. | 360/46 |
| 2002/0135943 A1 * | 9/2002 | Nishizawa et al. | 360/246.1 |
| 2004/0240109 A1 * | 12/2004 | Hamann et al. | 360/126 |
| 2005/0201001 A1 * | 9/2005 | Conteras et al. | 360/75 |

* cited by examiner

*Primary Examiner* — Jefferson Evans

(57) ABSTRACT

A write circuit and a head for a hard disk drive. The head includes a substrate that has an electrical ground and a write element that has a center tap. The head also has a resistor that is connected to the center tap and the electrical ground. The resistor provides a return path for AC and DC components of any common mode signal in a write circuit. The resistor can also generate heat that thermally expands the head and varies a head flying height. The write element is connected to an write driver circuit that provides in phase currents to a write element during the write operation and out of phase currents during a read operation. The out of phase currents allow for thermal expansion and flying height control even during a read operation.

13 Claims, 3 Drawing Sheets

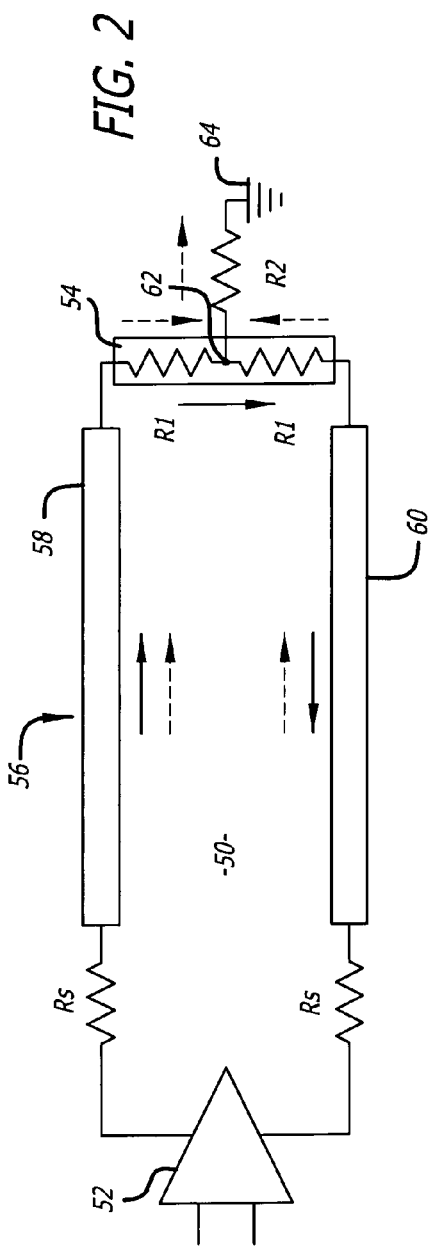
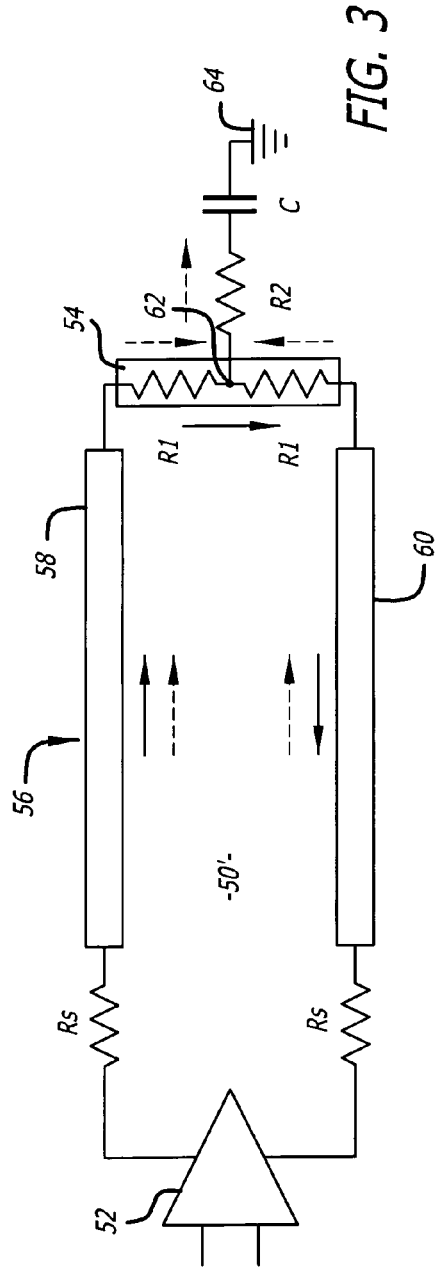

WRITE HEAD WITH COMMON MODE TERMINATION RESISTOR

BACKGROUND OF THE INVENTION

1. Field of the Invention

The present invention relates to a write circuit of a head of a hard disk drive.

2. Background Information

Hard disk drives contain a plurality of magnetic heads that are coupled to rotating disks. The heads write and read information by magnetizing and sensing the magnetic fields of the disk surfaces with separate write and read elements, respectively. Each head is attached to a flexure arm to create a subassembly commonly referred to as a head gimbal assembly ("HGA"). The HGA's are suspended from an actuator arm. The actuator arm has a voice coil motor that can move the heads across the surfaces of the disks.

The disks are rotated by a spindle motor of the drive. Rotation of the disks creates an air flow within the disk drive. Each head has an air bearing surface that cooperates with the air flow to create an air bearing between the head and the adjacent disk surface. The air bearing eliminates or minimizes the mechanical wear between the head and the disk. The height of the air bearing is commonly referred to as the flying height of the head.

The magnetic field detected by the head is inversely proportional to the flying height of the head. Likewise, the strength of the magnetic field written onto the disk is inversely proportional to the fly height. A larger fly height will produce a weaker magnetic field on the disk.

There have been developed heads that include a heater element. Current is provided to the heater element to generate heat and thermally expand the head to move the read and write elements closer to the disk. These types of heads are sometimes referred to as fly on demand ("FOD") heads. The flying height of FOD heads can be varied by changing the amount of power provided to the heater element.

The write elements of the heads are typically connected to a write driver circuit by a suspension interconnect that contains a number of internal conductive traces. The write driver, interconnect and write element create a write circuit. The electrical signal in the write circuit typically has two components, a differential signal and an undesirable common mode signal. The common mode component is typically created by noise. The common mode does not have a return path in the write circuit and thus behaves as an open circuit stub, with series and parallel resonance occurring at one-quarter and one-half wavelengths. The common mode noise can crosstalk onto the read traces. Additionally, the common mode can build charge on the write element. To alleviate the charge at the write element a trace can be connected to a write element center tap and ground. Such an approach can damp DC common mode but does not address AC common mode signals. Another approach is to ground both ends of the write element through resistors. The resistor values must be properly matched with the even and odd common mode suspension impedances to prevent impedance mismatch and resulting signal ringing, etc.

BRIEF SUMMARY OF THE INVENTION

A head for a hard disk drive. The head includes a substrate that has an electrical ground and a write element that has a center tap. The head also has a resistor that is connected to the center tap and the electrical ground.

BRIEF DESCRIPTION OF THE DRAWINGS

FIG. 2 is a schematic of a write circuit of the hard disk drive;

FIG. 3 is a schematic of an alternate embodiment of the write circuit;

DETAILED DESCRIPTION

Disclosed is a write circuit and a head for a hard disk drive. The head includes a substrate that has an electrical ground and a write element that has a center tap. The head also has a resistor that is connected to the center tap and the electrical ground. The resistor provides a return path for AC and DC components of any common mode signal in a write circuit. The resistor can also generate heat that thermally expands the head and varies a head flying height. The write element is connected to an write driver circuit that provides in phase currents (i.e. current flows in the same direction in two halves of the write element) during a write operation and out of phase currents during a read operation. The out of phase currents allow for thermal expansion and flying height control even during a read operation.

Figure 1:
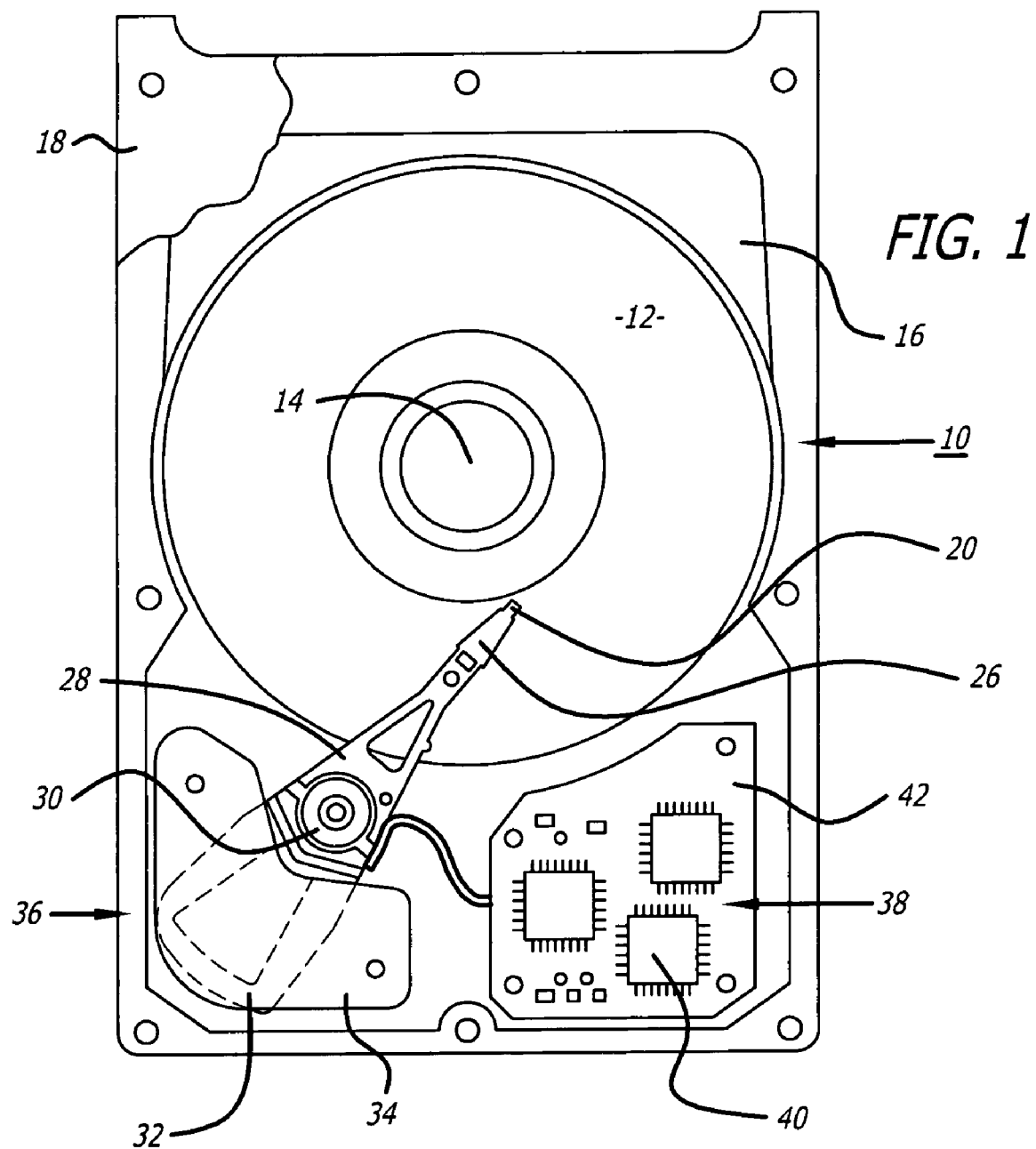
FIG. 1 is a top view of an embodiment of a hard disk drive.

Referring to the drawings more particularly by reference numbers, FIG. 1 shows an embodiment of a hard disk drive 10 of the present invention. The disk drive 10 may include one or more magnetic disks 12 that are rotated by a spindle motor 14. The spindle motor 14 may be mounted to a base plate 16. The disk drive 10 may further have a cover 18 that encloses the disks 12.

The disk drive 10 may include a plurality of heads 20 located adjacent to the disks 12. The heads 20 may have separate write and read elements (not shown). The write element magnetizes the disk 12 to write data. The read element senses the magnetic fields of the disks 12 to read data. By way of example, the read element may be constructed from a magneto-resistive material that has a resistance which varies linearly with changes in magnetic flux. The head 20 may be a perpendicular recording head. Each head also has a heater element (not shown). The heater element may receive current that generates heat in the head. The heat causes the head to thermally expand and varies the fly height. Such heads are commonly referred to fly on demand ("FOD") heads.

Each head 20 may be gimbal mounted to a flexure 26 as part of a head gimbal assembly (HGA). The flexures 26 are attached to an actuator arm 28 that is pivotally mounted to the base plate 16 by a bearing assembly 30. A voice coil 32 is attached to the actuator arm 28. The voice coil 32 is coupled to a magnet assembly 34 to create a voice coil motor (VCM) 36. Providing a current to the voice coil 32 will create a torque that swings the actuator arm 28 and moves the heads 20 across the disks 12.

The hard disk drive 10 may include a printed circuit board assembly 38 that includes a plurality of integrated circuits 40 coupled to a printed circuit board 42. The printed circuit board 42 is coupled to the voice coil 32, heads 20 and spindle motor 14 by wires (not shown).

FIG. 2 shows a write circuit 50 used to write information onto a disk. The write circuit 50 includes an write driver 52 connected to a write element 54 by a suspension interconnect 56. The interconnect 56 includes conductive traces 58 and 60 that electrically connect the write driver 52 to the write element 54. The write driver 52 has output resistors $R_s$. The write element 54 can be modeled as having two resistors $R_1$ and a center tap 62.

The write circuit 50 includes a resistor $R_2$ that is connected to the center tap 62 and electrical ground 64. The resistor $R_2$ provides a return path for any common mode noise in the write circuit 50. The resistor $R_2$ provides a return path for both AC and DC components of the common mode noise. To create proper impedance matching it is desirable if each resistor $R_1$ is approximately equal to the odd common mode impedance of the suspension interconnect 56 (i.e. $R_1=Z_o$) and the resistor $R_2$ is approximately equal to one-half of the difference between the odd and even common mode impedances of the interconnect 56 (i.e. $R_2=(Z_e-Z_o)/2$). FIG. 3 shows another embodiment of a write circuit 50' that includes a DC blocking capacitor C that is connected in series with resistor $R_2$ and ground 64.

The resistor $R_2$ may function as a heating element that thermally expands the head to vary a head flying height. During a write operation the write driver 52 may provide in phase currents as shown by the solid arrows in FIG. 2. The in phase currents generate electromagnetic fields that are additive and magnetize the disk to write information. Current primarily flows through resistor $R_1$. The current flowing through the $R_1$ resistor generates heat and thermally expands the head and varies the flying height.

During a read operation the write driver 52 can provide out of phase currents as indicated by the dotted arrows in FIG. 2. The electromagnetic fields of the out of phase currents cancel each other so that the write element 54 does not magnetize the disk. The currents flow through the resistors $R_1$ and $R_2$ so that the head is thermally expanded and a desired flying height is maintained during the read operation.

Figure 4:
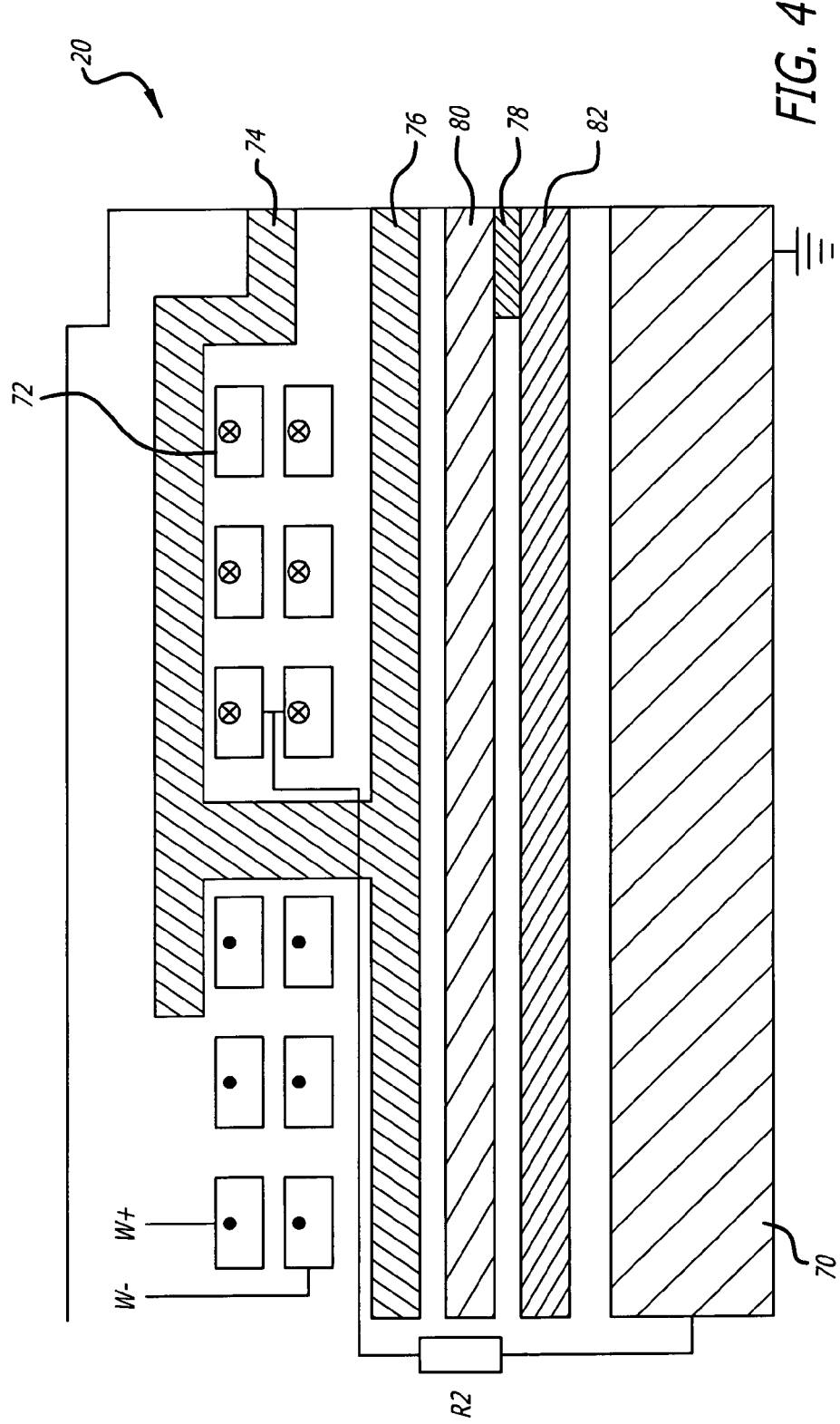
FIG. 4 is an illustration of a cross-section of a head.

FIG. 4 shows an embodiment of a head 20 with resistor $R_2$. The head 20 includes a substrate 70 that is electrically grounded. The head 20 further has a write coil 72 located between a pair of magnetic poles 74 and 76. Current can be provided to the coil 72 through write pads W− and W+. When the write coil 72 is excited a magnetic flux flows between the poles 74 and 76. A read element 78 may be located between a pair of shields 80 and 82. The read element 78 may sense a magnetic field from the disk.

The resistor $R_2$ is electrically connected to a center tap location of the write coil 72 and the substrate 70. The center tap location of the write coil 72 can be electrically coupled to the substrate 70. When current flows through the resistor $R_2$, heat is generated which thermally expands the head 20 and controls a head flying height.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A head for a hard disk drive, comprising:
   a substrate;
   a write element having a center tap coupled to said substrate;
   a suspension interconnect connected to said write element; and
   a resistor connected to said center tap and said substrate, said resistor having a value approximately one half of a difference of even and odd common mode impedances of said suspension interconnect.

2. The head of claim 1, further comprising a capacitor connected in series with said resistor.

3. The head of claim 1, wherein said resistor thermally expands the head to vary a head flying height.

4. The head of claim 3, further comprising a read element.

5. A write circuit for a hard disk drive, comprising:
   a write driver;
   a suspension interconnect coupled to said write driver;
   a write element connected to said suspension interconnect, said write element including a center tap; and
   a resistor connected to said center tap and an electrical ground, said resistor having a value approximately one half of a difference of even and odd common mode impedances of said suspension interconnect.

6. The circuit of claim 5, further comprising a capacitor connected in series with said resistor.

7. The circuit of claim 5, wherein said write driver provides a pair of in phase currents to said write element and said resistor during a write operation.

8. The circuit of claim 5, wherein said write driver provides a pair of out of phase currents to said write element and said resistor during a read operation.

9. The circuit of claim 5, further comprising a read element.

10. A method of operation of a head for a hard disk drive, comprising:
    providing a substrate;
    electrically coupling a write element having a center tap to said substrate;
    electrically connecting a suspension interconnect to said write element;
    electrically connecting a resistor to said center tap and said substrate, said resistor having a value approximately one half of a difference of even and odd common mode impedances of said suspension interconnect.

11. The method of claim 10, further comprising blocking a DC signal component from flowing between the center tap and the electrical ground with a capacitor connected in series with the resistor.

12. The method of claim 10, wherein there is provided a pair of in phase currents to the write element and the resistor during a write operation.

13. The method of claim 10, wherein there is provided a pair of out of phase currents to the write element and the resistor during a read operation.

* * * * *